United States Patent
Levy et al.

(10) Patent No.: US 10,068,034 B2
(45) Date of Patent: Sep. 4, 2018

(54) EFFICIENT MATCHING OF TCAM RULES USING HASH TABLES IN RAM

(71) Applicant: Mellanox Technologies TLV Ltd., Raanana (IL)

(72) Inventors: Gil Levy, Hod Hasharon (IL); Pedro Reviriego, Madrid (ES); Salvatore Pontarelli, Rome (IT)

(73) Assignee: Mellanox Technologies TLV Ltd., Raanana (IL)

( * ) Notice: Subject to any disclaimer, the term of this patent is extended or adjusted under 35 U.S.C. 154(b) by 189 days.

(21) Appl. No.: 15/257,957

(22) Filed: Sep. 7, 2016

(65) Prior Publication Data

US 2018/0068032 A1    Mar. 8, 2018

(51) Int. Cl.

| | |
|---|---|
| *G06F 17/30* | (2006.01) |
| *H04L 12/743* | (2013.01) |
| *H04L 29/06* | (2006.01) |
| *G11C 7/10* | (2006.01) |

(52) U.S. Cl.
CPC .. *G06F 17/30982* (2013.01); *G06F 17/30949* (2013.01); *H04L 45/7453* (2013.01); *H04L 63/0263* (2013.01); *H04L 69/22* (2013.01); *G06F 17/3033* (2013.01); *G11C 7/1009* (2013.01)

(58) Field of Classification Search
CPC ......... G06F 17/30982; G06F 17/30949; G06F 17/3033; H04L 45/7453; H04L 63/0263; H04L 69/22; G11C 7/1009
USPC ........................................................ 707/737
See application file for complete search history.

(56) References Cited

U.S. PATENT DOCUMENTS

| | | | |
|---|---|---|---|
| 6,611,875 B1 | 8/2003 | Chopra et al. | |
| 7,054,315 B2 * | 5/2006 | Liao | H04L 29/06 370/351 |
| 7,061,874 B2 * | 6/2006 | Merugu | H04L 47/10 370/255 |

(Continued)

FOREIGN PATENT DOCUMENTS

WO    2004095784 A2    11/2004

OTHER PUBLICATIONS

Hua, Nan, et al., "Variable-Stride Multi-Pattern Matching for Scalable Deep Packet Inspection", INFOCOM 2009, Rio de Janeiro, Brazil, Apr. 19-25, 2009, pp. 415-423.*

(Continued)

*Primary Examiner* — Robert Stevens
(74) *Attorney, Agent, or Firm* — D. Kligler IP Services Ltd.

(57) ABSTRACT

A method includes extracting classification keys from a collection of data items. A corpus of rules for matching to the classification keys is received, each rule including a respective set of unmasked bits having corresponding bit values, and at least some of the rules also include masked bits. Rule patterns are extracted from the corpus, each rule pattern defining a respective sequence of masked and unmasked bits to which one or more of the rules conforms. Multiple hash tables are defined in a RAM, each is used for searching for a rule that matches a given classification key. A match result of a given rule in a given hash table is also indicative of which of the other hash tables are to be used for subsequent searching. The data items are classified by matching the respective classification keys to the rules using one or more of the hash tables.

20 Claims, 4 Drawing Sheets

(56) References Cited

U.S. PATENT DOCUMENTS

| | | | |
|---|---|---|---|
| 7,116,663 B2* | 10/2006 | Liao | H04L 45/00 370/392 |
| 7,234,019 B1* | 6/2007 | Kao | G11C 15/00 707/999.006 |
| 8,271,564 B2 | 9/2012 | Dade et al. | |
| 8,290,934 B2 | 10/2012 | Stergiou et al. | |
| 8,305,271 B2 | 11/2012 | Li et al. | |
| 8,619,766 B2* | 12/2013 | Wang | H04L 45/00 370/389 |
| 8,856,203 B1* | 10/2014 | Schelp | G06F 12/02 370/389 |
| 9,098,601 B2* | 8/2015 | Wang | H04L 49/901 |
| 9,111,615 B1 | 8/2015 | Jiang | |
| 9,171,030 B1 | 10/2015 | Arad et al. | |
| 9,223,711 B2 | 12/2015 | Philip et al. | |
| 9,262,312 B1 | 2/2016 | Gazit et al. | |
| 9,317,517 B2 | 4/2016 | Attaluri et al. | |
| 9,344,366 B2 | 5/2016 | Bouchard et al. | |
| 9,424,366 B1* | 8/2016 | Gazit | G11C 15/00 |
| 9,438,505 B1 | 9/2016 | Zhou | H04L 49/3009 |
| 9,569,561 B2* | 2/2017 | Wildman | G06F 17/30982 |
| 9,627,063 B2* | 4/2017 | Dharmapurikar | G11C 15/04 |
| 9,659,046 B2 | 5/2017 | Sen et al. | |
| 9,704,574 B1* | 7/2017 | Shamis | G11C 15/04 |
| 9,779,123 B2 | 10/2017 | Sen et al. | |
| 9,785,666 B2 | 10/2017 | Li et al. | |
| 2002/0089937 A1 | 7/2002 | Venkatachary et al. | |
| 2003/0123459 A1* | 7/2003 | Liao | H04L 29/06 370/401 |
| 2008/0192754 A1* | 8/2008 | Ku | H04L 45/00 370/395.32 |
| 2008/0228691 A1 | 9/2008 | Shavit et al. | |
| 2010/0080223 A1 | 4/2010 | Wong et al. | |
| 2012/0275466 A1 | 11/2012 | Bhadra et al. | |
| 2013/0311492 A1 | 11/2013 | Calvignac et al. | |
| 2014/0006706 A1* | 1/2014 | Wang | G06F 17/30982 711/108 |
| 2014/0089498 A1 | 3/2014 | Goldfarb et al. | |
| 2014/0215144 A1* | 7/2014 | Valency | G06F 17/30982 711/108 |
| 2014/0310307 A1* | 10/2014 | Levy | H04L 45/7453 707/769 |
| 2015/0058595 A1 | 2/2015 | Gura et al. | |
| 2015/0127900 A1* | 5/2015 | Dharmapurikar | G11C 15/04 711/108 |
| 2015/0242429 A1 | 8/2015 | Varvello et al. | |
| 2015/0244842 A1* | 8/2015 | Laufer | H04L 69/22 370/392 |
| 2016/0294625 A1 | 10/2016 | Mahkonen et al. | |
| 2017/0046395 A1 | 2/2017 | Li et al. | |
| 2017/0346765 A1* | 11/2017 | Immidi | H04L 49/354 |

OTHER PUBLICATIONS

Levy et al., U.S, Appl. No. 14/827,373, filed Aug. 17, 2015, 51 pages.

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", 6 pages, year 2000 http://www.partow.net/programming/hashfunctions/.

Levy et al., U.S. Appl. No. 14/827,402, filed Aug. 17, 2015, 48 pages.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

Levy et al., U.S. Appl. No. 14/846,777, filed Sep. 6, 2015, 33 pages.

Levy et al., U.S. Appl. No. 15/086,095, filed Mar. 31, 2016, 50 pages.

Laurence et al., "Spam Based Architecture for tcam for Low Area and Less Power Consumption", ARPN Journal of Engineering and Applied Sciences, vol. 10, No. 17, pp. 7607-7612, Sep. 2015.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Demetriades et al., "An Efficient Hardware-basedMulti-hash Scheme for High Speed IP Lookup", 16th IEEE Symposium on High Performance Interconnects, pp. 103-110, Aug. 26-28, 2008.

Kasnavi et al., "A cache-based Internet protocol address lookup architecture", Computer Networks, vol. 52, pp. 303-326, year 2008.

European Application # 17189940 search report dated Jan. 26, 2018, 12 pages.

U.S. Appl. No. 14/827,373 office action dated Oct. 6, 2017, 37 pages.

U.S. Appl. No. 14/846,777 office action dated Nov. 30, 2017, 12 pages.

U.S. Appl. No. 14/827,402 office action dated Jul. 17, 2018, 37 pages.

* cited by examiner

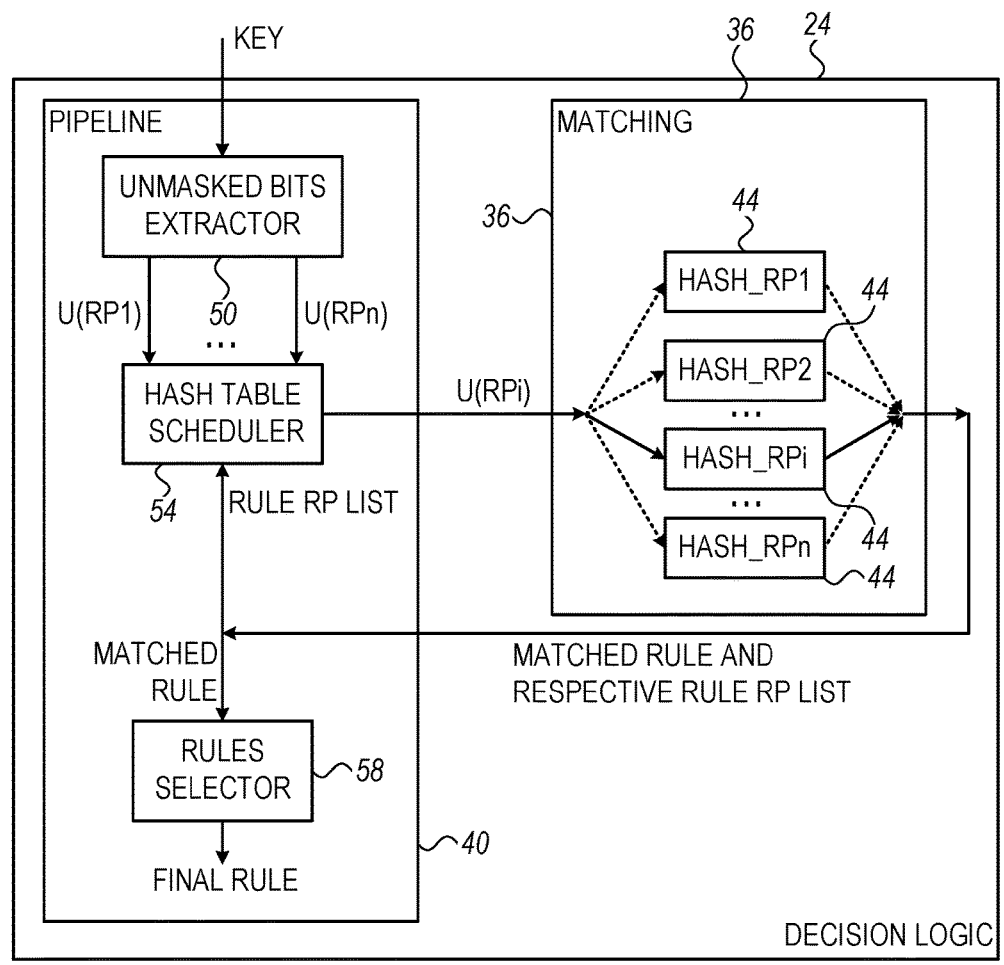
FIG. 2
FIG. 3
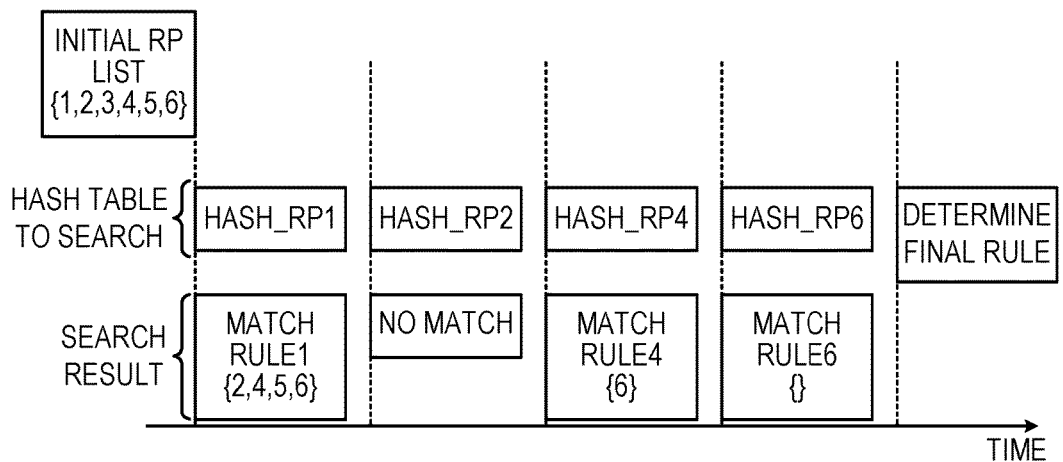

EFFICIENT MATCHING OF TCAM RULES USING HASH TABLES IN RAM

TECHNICAL FIELD

Embodiments described herein relate generally to network communication, and particularly to methods and systems for efficient storage and lookup of classification rules in network elements.

BACKGROUND

Packet-transfer devices in high-speed data networks, such as switches and routers, are required to perform flexible and sophisticated packet classification at high speed. For this purpose, many switches and routers use ternary content-addressable memory (TCAM) components to store rules that are to be applied in processing packets. To search the TCAM, several fields of the packet (typically header fields) are concatenated to form a key. A match between the key and a given TCAM entry can be used to trigger various actions in the network device, such as forwarding decisions, packet encapsulation and de-capsulation, security filtering, and quality of service classification.

TCAM is advantageous in that it is able to hold search entries that contain not only ones and zeroes, to be matched against the key, but also "don't care" bits, which will match either a zero or a one in the key. These "don't care" bits in the TCAM entries are commonly referred to as "masked" bits, while bits having a defined value (1 or 0) are referred to as "unmasked." TCAM thus affords a high degree of flexibility in rule definition. As against these advantages, however, TCAMs are costly in terms of power consumption and chip area, and these costs effectively limit the number of rules that can be supported by a single network device.

SUMMARY

An embodiment that is described herein provides a method including extracting classification keys from a collection of data items. A corpus of rules for matching to the classification keys is received, each rule including a respective set of unmasked bits having corresponding bit values, and at least some of the rules also include masked bits. Rule patterns are extracted from the corpus, each rule pattern defining a respective sequence of masked and unmasked bits to which one or more of the rules conforms. Multiple hash tables are defined in a RAM, each is used for searching for a rule that matches a given classification key. A match result of a given rule in a given hash table is also indicative of which of the other hash tables are to be used for subsequent searching. The data items are classified by matching the respective classification keys to the rules using one or more of the hash tables.

In some embodiments, matching the classification keys includes extracting from the classification keys bit strings of unmasked bits in accordance with the respective rule patterns, and searching for matching rules in the hash tables using the extracted bit strings of the unmasked bits. In other embodiments, the rules are assigned respective rule priorities, and matching the classification keys includes selecting an outcome rule from among multiple matching rules that match a given classification key and conform to different respective rule patterns, based on the rule priorities of the matching rules. In yet other embodiments, defining the hash tables includes excluding from the other hash tables, which are to be subsequently searched according to a given rule, a hash table whose entire rules do not match any classification key that matches the given rule.

In an embodiment, defining the hash tables includes excluding from the other hash tables, which are to be subsequently searched according to a given rule, a hash table whose rules are all assigned respective rule priorities lower than a rule priority assigned to the given rule. In another embodiment, defining the hash tables includes determining a scanning order of the other hash tables based on rule priorities assigned to the rules of the other hash tables. In yet another embodiment, defining the hash tables includes determining a scanning order of the other hash tables, based on numbers of hash tables to be searched according to the rules in the other hash tables.

In some embodiments, defining the hash tables includes determining a scanning order of the other hash tables based on numbers of rules conforming to the respective rule patterns of the other hash tables. In other embodiments, defining the hash tables includes assigning to the rules in each of the hash tables respective lists of one or more other hash tables to search when a matching rule is found, and in response to adding a rule to a respective given hash table, including the given hash table in lists assigned to rules in other hash tables based on the added rule. In yet other embodiments, matching the classification keys includes scanning multiple hash tables sequentially, and adapting a scanning order of the hash tables based on rules that were previously found matching to the classification keys.

There is additionally provided, in accordance with an embodiment that is described herein an apparatus, including a random access memory (RAM) and a decision logic pipeline. The RAM is configured to store hash tables corresponding to a corpus of rules, each rule including a respective set of unmasked bits having corresponding bit values, and at least some of the rules includes masked bits in addition to the unmasked bits. The rules conform to respective rule patterns, each rule pattern defining a different, respective sequence of masked and unmasked bits to which one or more of the rules conform, and each of the hash tables corresponds to a respective rule pattern and used for searching among the rules conforming to that rule pattern for a rule that matches a given classification key. A match result of a given rule in a given hash table is also indicative of which of the other hash tables are to be used for subsequent searching of rules that match the given classification key. The decision logic pipeline is configured to define the hash tables stored in the RAM, to extract respective classification keys from a collection of data items, each classification key including a string of bits, and to classify the data items by matching the respective classification keys to the rules using one or more of the hash tables.

These and other embodiments will be more fully understood from the following detailed description of the embodiments thereof, taken together with the drawings in which:

BRIEF DESCRIPTION OF THE DRAWINGS

FIG. 2 is a block diagram that schematically illustrates decision logic for rule matching, in accordance with an embodiment that is described herein;

FIG. 3 is a diagram that shows an example rule matching process, in accordance with an embodiment that is described herein;

DETAILED DESCRIPTION OF EMBODIMENTS

Overview

Figure 1:
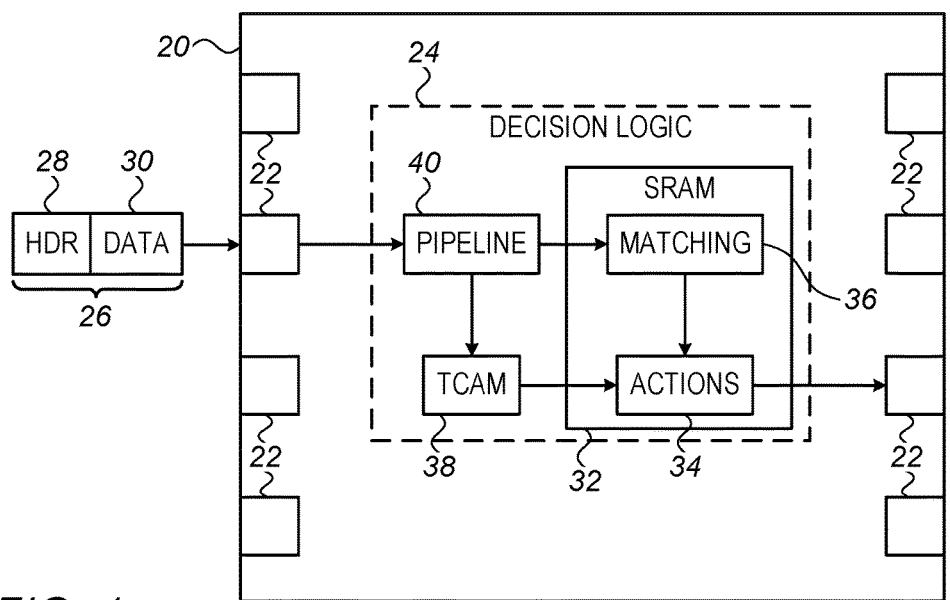
FIG. 1 is a block diagram that schematically illustrates a packet switch, in accordance with an embodiment that is described herein.

Large-scale, high-speed packet networks, such as those deployed in modern data centers, require switching and forwarding elements to support large numbers of rules for packet classification and handling. New network management standards and practices, such as the OpenFlow protocol, are driving demand both to increase the number of rules implemented by network elements and to enable frequent modification of the rules by remote administration. Given the cost, size, and power consumption of TCAM devices, there is a need for RAM-based packet classification solutions. RAM-based solutions are also advantageous in that RAM in a network element can be shared flexibly between packet classification and other functions, in contrast to TCAM, which is dedicated to a single purpose.

Embodiments of the present invention that are described herein provide an efficient framework for classification of data items, such as data packets, using rule entries stored in RAM. The disclosed embodiments include the following components:

A RAM (e.g., a static RAM-SRAM) to store most of the rules, possibly shared with other data.

A small TCAM to store a minor part of the rules.

The rules in the RAM are stored in a matching data base that is organized in a relatively small number of hash tables corresponding to respective masked and unmasked bit patterns of the rules. A TCAM-like search is emulated by performing multiple exact matching lookups using the hash tables. Based on matching rules found, searching in hash tables of irrelevant rule patterns is omitted, thus enabling a higher lookup rate.

The disclosed embodiments enable exact matching of classification keys using hash tables. (Hash tables require only RAM, and not TCAM.) Since TCAM rules can include don't care ('x') bits, they cannot be directly used in the exact matching tables, because a hash function will not generally map all the rules that match the 'x' bits to a unique hash-table entry. Therefore, in the present embodiments, the rules are mapped to entries in a matching table in RAM using only the bits of the rules that are unmasked (having the value '1' or '0', and not 'x'). This mapping makes use of "rule patterns," which define sequences of masked and unmasked bits to which one or more of the rules conform. In other words, denoting the unmasked bits as 'u' (which can be '0' or '1' but not 'x'), any given rule pattern is defined by the positions of the 'u' bits. The rules belonging to a rule pattern can then be stored and retrieved using exact matching on the 'u' bits.

If the complete set of rule patterns were used for matching, the number of accesses to the hash tables in the RAM would grow with the number of rule patterns, resulting in performance degradation. The disclosed embodiments address this problem in several ways:

By avoiding rule patterns that, based on previously-found matching rules, are expected to produce no match. Special flags can also be added to the rules in order to force end-of-search upon matching a rule for which there is no other possible matching rule with higher priority.

By scanning the hash tables in an order that may reduce the average number of hash tables scanned per classification key.

The small TCAM can be used to temporarily store new rules until they are incorporated into the matching database in the RAM. Rules that belong to a rule pattern with a small number of rules can also be stored in the TCAM. Lookup for each key is typically performed initially in the RAM, and the TCAM is accessed as needed based on the results of the RAM lookup.

In some of the disclosed embodiments, a network element or other classification apparatus comprises a decision logic pipeline. The pipeline extracts respective classification keys from a collection of data items, such as data packets arriving at the network element. Each classification key comprises a string of bits. In packet classification, for example, each classification key comprises one or more field values extracted from the header of a packet to be classified. A corpus of rules is provided for matching to the classification keys, and rule patterns are extracted from the corpus. The rule patterns define different, respective sequences of masked and unmasked bits to which one or more of the rules conform, as explained above.

Rule entries corresponding to the rules are then computed using the rule patterns, and these rule entries are stored in respective hash tables. The resulting data structure thus comprises a set of hash tables. Each hash table in the set corresponds to a respective rule pattern (a unique sequence of unmasked bits), and used for searching among the rules conforming to that rule pattern for a rule that matches a given classification key. A rule entry of a given rule in a hash table is indicative of (possibly in addition to other parameters) which of the other hash tables should be looked up in response to matching the given classification key to the given rule.

In the context of the present patent application and in the claims, the term "indicative of which other hash tables are to be searched" refers to either positive indication (e.g., specifying one or more hash tables to be subsequently searched), negative indication (e.g., specifying one or more hash tables to be pruned and not searched), or any other indication that distinguishes between hash tables to be searched and hash tables to be pruned and not searched.

The decision logic pipeline classifies the data items by matching the respective classification keys to the rule entries in the hash tables.

Note that a classification key can match multiple rules in multiple respective hash tables. In an embodiment, the decision logic selects an outcome rule from among multiple matching rules that conform to different respective rule patterns, based on rule priorities assigned to the rules. Alternatively or additionally, other criteria for selecting the outcome rule can also be used.

As noted above, a rule entry is indicative of which of the other hash tables (or rule patterns) should be looked up upon finding a match between the classification key and the respective rule. The specific way of specifying the hash tables to be searched is implementation dependent, and many implementations are possible. For example, in some embodiments, the hash tables to be searched are specified positively. In such embodiments, the scanning order of the hash tables is taken into consideration when compiling the rules and the respective specified hash tables, so that a previously skipped hash table will not be looked up as a result of a later found matching rule. In other embodiments, the matching rule specifies the hash tables to be excluded or pruned from the search. In such embodiments, all the hash tables are initially specified to be searched, and when a matching rule is found, hash tables are pruned from the current search as specified by the matching rule.

In some embodiments, scanning the hash tables is carried out using a state variable that is indicative of the currently specified hash tables to be searched. For example, the state variable may specify the hash tables to be searched, or the hash tables to be pruned and not searched. When a matching rule is found, the state variable is updated based on the hash tables specified by this matching rule.

In some embodiments, the hash tables (or respective rule patterns) that a given rule is indicative of are comprised in a list that is also referred to herein as a "RP list." The RP list may be implemented using any suitable data structure. Generally, RP lists that indicate only a small number of hash tables to be searched for matching rules are advantageous. When a matching rule is found in some hash table, its RP list is used for traversing other hash tables until another match occurs in another hash table, in which case the RP list is updated, or until the entire RP list has been traversed.

To construct a RP list for a given rule, the rules in the other hash tables are compared with the given rule. A hash table that contains at least one rule that matches a key that also matches the given rule should be included in the RP list. Inversely, if all the keys that match the given rule have no matching rule in some hash table, this hash table can be excluded from the RP list of the given rule. In some embodiments, a hash table whose rules have lower rule priorities than the rule priority of the given rule is excluded from the RP list of the given rule.

In the disclosed techniques, the hash tables are typically looked up one at a time. The scanning order of the hash tables typically has a major impact on the search performance. In some embodiments, the scanning order is based on rule priorities. For example, in one embodiment, when finding a matching rule with a given priority, looking up in a hash table whose rules have lower priorities than the given priority can be omitted. In some embodiments, the scanning order is based on the numbers of rules populating the respective hash tables. Starting the scanning with highly populated hash tables may be advantageous because it is typically more likely to find a matching rule in highly populated hash tables. In some embodiments, the scanning order is determined based on the length of the RP lists, so that hash tables whose rules have short RP lists are looked up first. In some embodiments, the initial list of the hash tables to scan is shortened using Bloom filter techniques.

Adding a new rule to some hash table may require adding this hash table to the RP lists of rules in other hash tables. In some embodiments, in response to adding a new rule to a given hash table, the RP lists of the rules in all the other hash tables are updated to include the given hash table to be searched, based on the added rule. In some embodiments, updating the RP lists may take a long period of time, during which the given hash table is looked up in response to finding a matching rule, even when the RP list of the matching rule does not contain the given hash table.

In the disclosed techniques, efficient rule lookup is performed by searching for matching rules in only a partial subset of the hash tables without sacrificing the search accuracy. In typical practical implementations, using the disclosed techniques may reduce the number of hash tables searched by half.

System Description

FIG. 1 is a block diagram that schematically illustrates a network element 20, which operates as packet classification apparatus in accordance with an embodiment of the invention. Typically, network element 20 is configured as a network switch or router, for example, with multiple ports 22 connected to a packet communication network. Decision logic 24 within element 20 applies classification rules in forwarding data packets 26 between ports 22, as well as performing other actions, such as encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 24.

In the pictured embodiment, decision logic 24 receives packet 26 containing a header 28 and payload data 30. A processing pipeline 40 in decision logic 24 extracts a classification key from each packet 26, typically (although not necessarily) including the contents of certain fields of header 28. For example, the key may comprise the source and destination addresses and ports and a protocol identifier. Pipeline 40 matches the key against a matching database 36 containing a set of rule entries organized in multiple hash tables, which are stored in an SRAM 32 in network element 20, as described in detail hereinbelow. A rule entry in a hash table of a given rule pattern is indicative of which of the other hash tables (or rule patterns) should be searched in case the respective rule is matched. As noted above, the rule entry may specify the hash tables to be searched positively, or alternatively specify the hash tables to be excluded from the current search, as described above. SRAM 32 also contains a list of actions 34 to be performed when a key is found to match one of the rule entries. For this purpose, each rule entry typically contains a pointer to the particular action that logic 24 is to apply to packet 26 in case of a match.

In addition, network element 20 typically comprises a TCAM 38, which contains rules that have not been incorporated into the matching database 36 in SRAM 32. TCAM 38 may contain, for example, rules that have recently been added to network element 20 and not yet incorporated into the data structure of matching database 36, and/or rules having rule patterns that occur with low frequency, so that their incorporation into the data structure of matching database 36 would be impractical. The entries in TCAM 38 likewise point to corresponding actions 34 in SRAM 32. Pipeline 40 may match the classification keys of all incoming packets 26 against both matching database 36 in SRAM 32 and TCAM 38. Alternatively, TCAM 38 may be addressed only if a given classification key does not match any of the rule entries in database 36 or if the matching rule entry indicates (based on the value of a designated flag, for example) that TCAM 38 should be checked, as well, for a possible match to a rule with higher priority.

In some embodiments, rule entries in the TCAM are indicative of hash tables to be searched, similarly to the rule entries of the hash tables. In such embodiments, the RP lists may include the TCAM as a table to be looked up. In an embodiment, the TCAM is configured to be the last table to be searched, in which case the rule entries in the TCAM should not hold any RP lists.

The balance between the size of the set of rule entries in database 36 in SRAM 32 and the size of TCAM 38 can be determined at the convenience of the designer of decision logic 24. In any case, TCAM 38 will be considerably smaller than would be required to hold the entire corpus of classification rules. In some cases, SRAM 32 may contain rule entries in database 36 corresponding to all of the classification rules, in which case TCAM 38 may be eliminated.

The rule patterns and rule entries corresponding to a given corpus of rules may be computed by a suitable programmable processor that is embedded in the classification apparatus itself. Alternatively or additionally, an external computer may receive the rules and compile the rule entries for download to the memory of the classification apparatus.

Efficient Rule Matching Using Partial Subsets of the Hash Tables

A conventional TCAM can match a given classification key to a rule that comprises unmasked bits having defined values, and one or more masked bits whose values are undefined and serve as don't care values. For example, the rule '100xxx01' has five unmasked bits having binary values '1' or '0', and three don't care bits denoted 'x'. Each rule is associated with a respective rule pattern (RP) that defines the positions of unmasked and masked bits in the bit string representing the rule.

Unmasked and masked bits in a rule pattern are denoted 'u' and 'x', respectively. For example, the RP 'uuuxxxuu' corresponds to the rule '100xxx01'. Typically, multiple rules may conform to a common RP. For example, both rules '100xxx01' and '111xxx00' conform to the same rule pattern 'uuuxxxuu'.

A corpus comprising m rules denoted R1 . . . Rm can be partitioned into a number n of rule patterns RP1 . . . RPn. In practical implementations, the number of rules is much larger than the number of RPs to which these rule conform, i.e., n<<m.

In the disclosed embodiments, the m rules are classified in accordance with the n rule patterns. The rules that conform to a given rule pattern are searched using a dedicated search engine that is implemented using a hash tables, i.e., n hash tables overall. Note that a given classification key may match rules in only a partial subset of the n hash tables and therefore excluding from the search irrelevant hash tables may reduce the search latency considerably. Methods for identifying hash tables that can be excluded from the search without sacrificing the search accuracy are described in detail below.

FIG. 2 is a block diagram that schematically illustrates decision logic 24 for rule matching, in accordance with an embodiment that is described herein. For the sake of clarity, FIG. 2 depicts only elements of decision logic 24 that participate in the rule matching process.

Matching database 36 of the decision logic comprises multiple search engines implemented using hash tables 44 denoted HASH_RP1 . . . HASH_RPn. The hash tables correspond to the respective rule patterns RP1 . . . RPn and are stored in a SRAM. Given a classification key, each of the hash tables is used for matching the key to rules that conform to the respective RP as will be described below. Searching for matching rules using the entire hash tables in the RAM is equivalent to searching the key using a TCAM that stores the same m rules.

Pipeline 40 of the decision logic comprises an unmasked bits extractor module 50, which receives a classification key and extracts from the key n unmasked bit strings denoted U(RP1) . . . U(RPn) in accordance with the respective rule patterns RP1 . . . RPn. In an embodiment, pipeline 40 extracts the unmasked bit strings using respective mask vectors. For example, given a key K='11101100' and a rule pattern RP='uuuxxxuu', the unmasked bit string extracted is given by U(RP)='11100'. Note that unmasked bit strings extracted using different RPs may have different respective lengths.

A scheduler 54 receives the extracted unmasked bit strings and provides them to matching database 36. The unmasked bit strings are used for matching the key to rules in the respective hash tables, i.e., U(RPi) uses for matching the key to rules in hash table HASH_RPi. In some of the disclosed embodiments, scheduler 54 scans the hash tables sequentially in accordance with some predefined order. Scheduler 54 may skip scanning one or more of the hash tables in which the matching is expected to fail, as will be described in detail below.

A hash table HASH_RPi maps unmasked bit strings to rules that conform to the respective rule pattern RPi. The hash tables are populated based on the actual rules in the corpus. Each rule in the corpus therefore has a respective rule entry in one of the hash tables corresponding to the respective RP.

In some embodiments, each rule entry in the hash tables stores a pointer to a particular action in actions table 34 that decision logic 24 is to apply to packet 26 in case of a match. In some embodiments, the rule entry additionally holds an RP list (or a pointer to such list) that specifies the hash tables in which to search in case of a match to the respective rule. As described above, the RP list may alternatively specify hash tables that should be pruned or excluded from the current search. The RP lists can be implemented using any suitable data structures and are constructed and stored beforehand as will be described below. For example, an RP list may comprise a binary vector in which each bit corresponds to a respective hash table and determines whether the hash table should be searched or not.

When a matching rule is found in HASH_RPi, matching database 36 delivers the matching rule and the respective RP list to scheduler 54 in pipeline 40. Scheduler 54 then scans the hash tables in the reported RP list. A rule selector 58 receives one or more matching rules from matching database 36, and selects from these rules a final rule (or outcome rule) using a predefined criterion. In an example embodiment, each rule is assigned a respective rule priority, and rule selector 58 selects the matching rule having the highest rule priority. Alternatively, other criteria for selecting the final rule can also be used.

Now we describe embodiments for constructing the rule RP lists. In some embodiments, constructing the RP lists is based on the values of the corpus rules. The construction is based on the observation that a key that matches a rule conforming to a given RP does not necessarily match rules that conform to a different RP. Therefore, if all the keys that match a given rule have no matching rules in some other hash table, this other hash table can be excluded from the RP list of the given rule.

Consider, for example, the rules in Table 1 below. The rules in this example are defined using the five-tuple: source IP, destination IP, protocol, L4 source port and L4 destination port.

TABLE 1

Example rules and respective RPs

| | Rule fields | | |
|---|---|---|---|
| | R1 | R2 | R3 |
| Source IP | 130.100.X.X | 140.100.200.X | 130.100.13.X |
| Destination IP | 120.40.X.X | 120.40.X.X | 120.40.X.X |
| Protocol | X | X | X |

TABLE 1-continued

Example rules and respective RPs

| | Rule fields | | |
|---|---|---|---|
| | R1 | R2 | R3 |
| L4 source port | X | 21 | 21 |
| L4 destination port | X | X | X |
| Rule pattern | RP1 = U.U.X.X, U.U.X.X, X, X, X | RP2 = U.U.U.X, U.U.X.X, X, U, X | RP3 = U.U.U.X, U.U.X.X, X, U, X |

In Table 1, the rule R1 conforms to rule pattern RP1 and the rules R2 and R3 both conform to another common rule pattern, i.e., RP2=RP3. Note that since in R1 and R2 the source IPs start with 130 and 140, respectively, a key that matches R1, cannot also match R2. Note that eliminating the entire hash table containing R2 from the RP list of R1 depends on all the rules in that hash table. If, for example, a hash table contains both R2 and R3 of Table 1, this hash table should be included in the RP list of R1, because R1 and R3 can both match a common key.

A method for constructing the RP list for R1 in HASH_RP1 is given herein. First initialize the RP list for R1 to {RP2 . . . RPn}. Then compare the unmasked bits of R1 that are also unmasked bits in the rules in HASH_RP2. If at least one unmasked bit at a given bit-position in R1 is different from the unmasked bits at the same bit-position in all the rules in HASH_RP2, exclude HASH_RP2 from the RP list of R1. The procedure is repeated similarly to HASH_RPi, i=3 . . . n.

In an embodiment, the exclusion criterion for rule patterns RPi, RPj is implemented as follows. Define a bit-mask for extracting bits that are unmasked in both RPi and RPj. Let Ri be a rule that conforms to RPi. Using the bit-mask extract an unmasked bit string Ui from Ri. Compare Ui with unmasked bit strings Uj extracted (using the same bit-mask) from each of the rules that conform to RPj. If Ui differs from all Uj, exclude RPj from the RP list of Ri.

In some embodiments, constructing the RP lists is based on rule priority. Consider a rule matching system in which each of the rules is assigned a respective priority in a predefined priority range. If, for example, a matching rule is found in a given hash table and this matching rule has the highest priority in the priority range, searching in all other hash tables can be omitted. More generally, for a matching rule Ri in HASH_RPi whose priority is denoted Pi, a hash table HASH_RPj whose rules have respective rule priorities lower than Pi can be excluded from the RP list of Ri.

In some embodiments, the priorities assigned to the rules in the hash tables belong to respective different non-overlapping subranges of the priority range. In such embodiments, the hash tables are scanned from the highest priority subrange to the lowest priority subrange. This is because when pruning is based only on rule priorities, scanning the hash tables in descending priority order would result in minimal average searching time.

Decision logic 24, including pipeline 40, typically comprises dedicated or programmable hardware logic, which is configured to carry out the functions described herein. Pipeline 40 typically also contains a number of banks of dedicated memory for implementation of Bloom filters (not shown in the figure), either on the same chip as the hardware logic or in a separate memory chip. For example, pipeline 40 of the decision logic may comprise a suitable application-specific integrated circuit (ASIC). Alternatively or additionally, at least some of the functions of pipeline 40 may be implemented in a standalone or embedded microprocessor. (For example, such a microprocessor may be responsible for compiling classification rules received by network element 20 into matching database 36.) The microprocessor performs its functions under the control of software instructions, which are typically stored in tangible, non-transitory computer-readable storage media, such as electronic, optical, or magnetic memory media.

FIG. 3 is a diagram that shows an example rule matching process, in accordance with an embodiment that is described herein. In FIG. 3, decision logic 24 scans hash tables 44 sequentially, and upon finding a matching rule in a given hash table, adapts the RP list based on the matching rule. The example of FIG. 3 refers to decision logic 24 in which the matching database comprises six hash tables. In the present example, the RP lists positively specify the hash tables to be searched.

The initial RP list is given by {1, 2, 3, 4, 5, 6}, i.e., a sequential scanning of all the hash tables. In this example, a matching rule was found in the first hash table, and the RP list associated with this matching rule is {2, 4, 5, 6}, which indicates that no matching rule can be found in HASH_RP3. Next, the decision logic attempts to find a matching rule in HASH_RP2, which is the first hash table in the updated RP list. In the present example, no matching rule is found and the decision logic skips HASH_RP3 and proceeds to search in HASH_RP4, which is the next hash table in the current list. In HASH_RP4, a matching rule is found, whose RP list is {6}. Therefore, the decision logic skips HASH_RP5 and finds a matching rule in HASH_RP6. In the present example, three matching rules have been found, i.e., in HASH_RP1, HASH_RP4 and HASH_RP6. The decision logic determines the final rule by selecting the matching rule having the highest rule priority.

Figure 4:
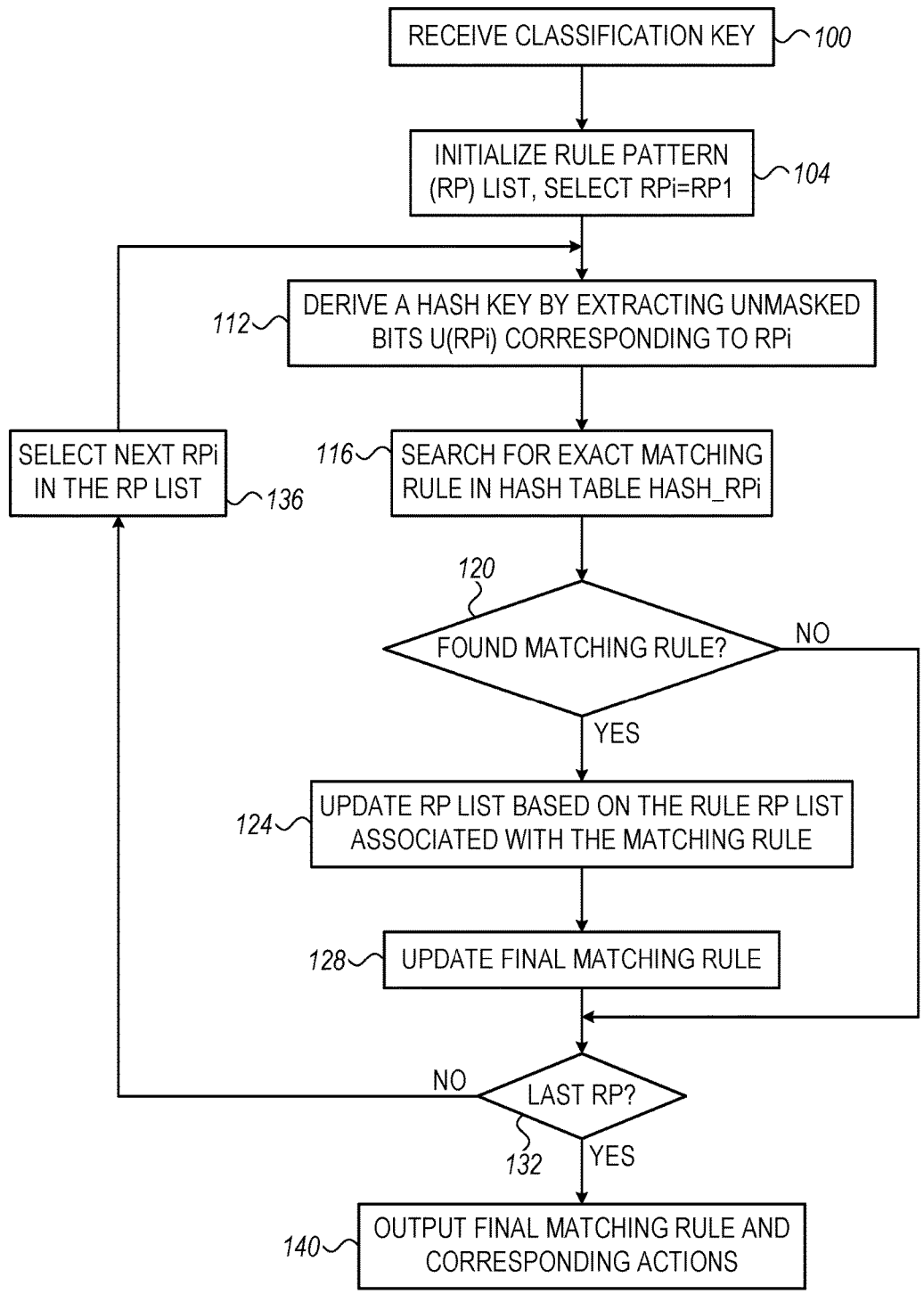
FIG. 4 is a flow chart that schematically illustrates a method for packet classification, in accordance with an embodiment that is described herein.

FIG. 4 is a flow chart that schematically illustrates a method for packet classification, in accordance with an embodiment that is described herein. The method is described as being executed by decision logic 24 of FIGS. 1 and 2.

At a reception step 100, the decision logic receives a classification key, which was derived from headers of packet 26 accepted in network element 20 of FIG. 1. At an initialization step 104, scheduler 54 initializes the RP list to include all the rule patterns RP1 . . . RPn, in that order. Considerations for ordering the RP list are described further below. Scheduler 54 additionally selects the first RP in the RP list, i.e., RPi=RP1. Although in this example the RP list is described in terms of RPs, the RP list can equivalently be described in terms of the respective hash tables.

In some embodiments, to shorten the search duration, one or more RPs are excluded from the initial full RP list of step 104, e.g., using Bloom filter techniques. Various aspects of classification using Bloom filters are addressed in U.S. patent application Ser. No. 14/827,402, which is assigned to the assignee of the present patent application and whose disclosure is incorporated herein by reference.

At a hash key generation step 112, extractor 50 extracts the unmasked bits U(RPi) from the classification key, in accordance with RPi. At a table searching step 116, the extracted unmasked bits serve as a hash key for searching for a matching rule in hash table HASH_RPi. At a match-checking step 120, matching database 36 checks whether a matching rule was found in HASH_RPi, and if so, at an RP list updating step 124, the matching data base delivers the updated RP list associated with the matching rule to the scheduler, and also delivers the matching rule to matching rules selector 58. At a rule selection step 128, matching rules selector 58 updates the final matching rule by saving the matching rule having the highest priority.

At a loop termination step 132, the scheduler checks whether the entire RP list has been scanned. This step is executed following step 128 or when no matching rule was found at step 120 above. If at step 132 the updated RP list contains RPs not yet scanned, the scheduler set the RP index to the next RPi in the RP list, and loops back to step 112 to derive a hash key based on the selected RPi. Otherwise, the search is concluded and at an output step 140, the decision logic outputs the final matching rule selected by selector 58, as well as the actions to be applied to the packet in accordance with the final matching rule, and the method terminates. In case no matching rule was found in any of the hash tables, the decision logic issues a failure indication.

As describe above, the number of hash tables to be searched, and therefore the overall searching duration, depends on the scanning order of the RPs in the RP list. Ordering the RP list can be done in various ways. For example, in some embodiments, the scheduler scans the hash tables in a descending order of the respective number of rules in each hash table, because the probability of finding a matching rule typically increases with the number of rules in the hash table.

In other embodiments, the scheduler scans the hash tables according to the respective rule priorities. In this approach, if a matching rule with a high priority is found at an early stage of the search, searching in other hash tables in which the rules have lower priorities can be omitted.

In some embodiments, each rule is assigned a pruning factor that indicates the pruning strength of the rule. For example, the pruning factor is set to the reciprocal value of the length of the respective RP list, i.e., starting with matching to rules having shorter RP lists is typically more efficient. In these embodiments, the order of the RPs in the RP lists is determined, for example, by averaging the pruning factors in the respective hash tables, and ordering the RPs in accordance with the averaged pruning factors.

In some embodiments, the scheduler changes the ordering of the RP list adaptively. For example, the decision logic may identify rules that occur more frequently than others, and attempt matching the classification key to these rules before rules that are matched rarely.

Adding Rules to the Matching Database

As described above, the RP list of a rule that conforms to a rule pattern RPi contains some rule pattern RPj depending on all the rules that conform to RPj. Therefore, adding a new rule to a hash table of some rule pattern RPj may require including RPj in the RP lists of one or more rules across the matching database.

Figure 5:
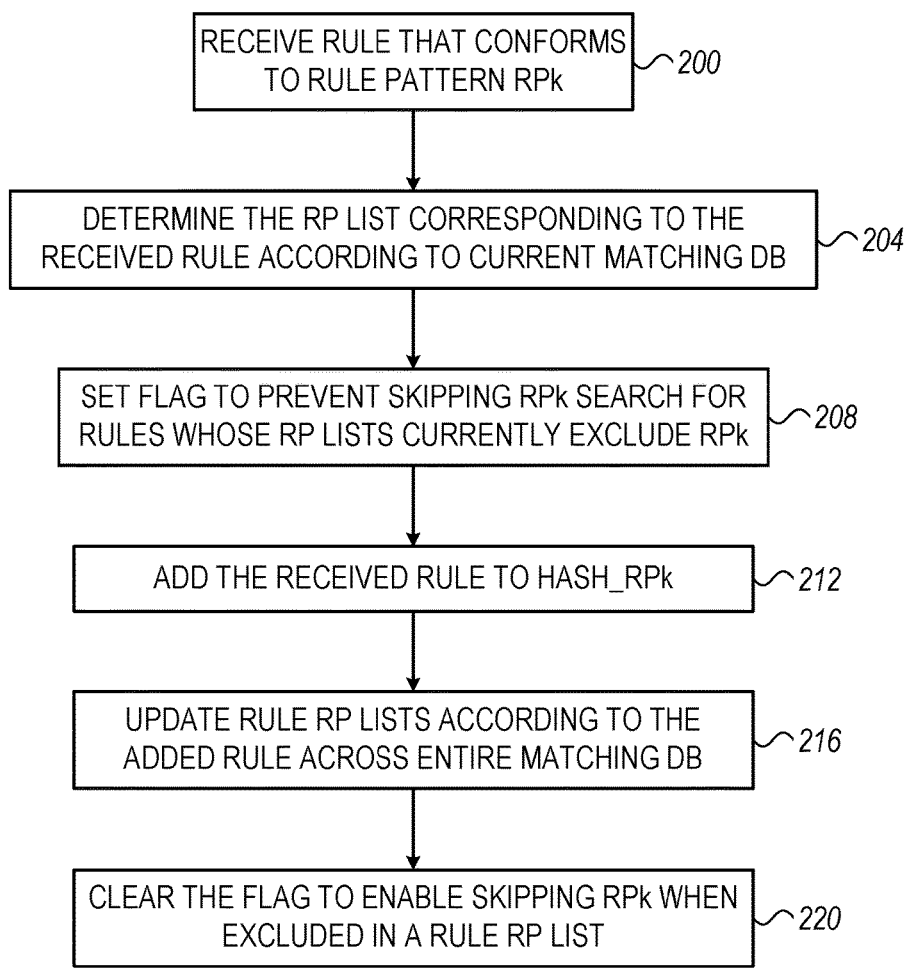
FIG. 5 is a flow chart that schematically illustrates a method for adding a rule to a matching database, in accordance with an embodiment that is described herein.

FIG. 5 is a flow chart that schematically illustrates a method for adding a rule to a matching database, in accordance with an embodiment that is described herein. The method is described as being executed by decision logic 24 of FIGS. 1 and 2.

At a rule reception step 200, decision logic 24 receives a rule having a rule pattern RPk to be added to hash table HASH_RPk in matching data base 36. The rule may be stored in TCAM 38 and transferred to matching database 36, or provided directly for storage in the matching database.

At a list calculation step 204, the decision logic scans the rules in hash tables HASH_RPj, for j=1 . . . n and j≠k, and constructs a RP list for the received rule, as described above.

At a flag setting 208, the decision logic sets a flag to indicate that the matching data base is being updated. More specifically, the flag indicates that during the update, HASH_RPk should be searched even when the RP list of a matching rule found does not contain RPk.

At a rule addition step 212, the received rule is added to HASH_RPk. Then, at an RP lists updating step 216, the decision logic scans the rules in all the other hash tables and updates the respective rule RP lists to include RPk, based on the added rule value, priority or both. At a flag reset step 220, after updating the entire matching database, the decision logic resets the flag that was set at step 208 above, and the method terminates.

The embodiments described above are given by way of example, and other suitable embodiments can also be used. For example, although in the embodiments described above the hash tables are stored in a volatile memory such as a RAM, in alternative embodiments the hash tables may be stored in a nonvolatile memory such as a nonvolatile RAM (NVRAM). As another example, although in the embodiments described above, the hash tables are scanned one at a time, in other embodiments, two or more hash tables may be searched in parallel, to further improve the lookup rate.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for classification, comprising:
   extracting, in a decision logic pipeline, respective classification keys from a collection of data items, each classification key comprising a string of bits;
   receiving a corpus of rules for matching to the classification keys, each rule comprising a respective set of unmasked bits having corresponding bit values, and at least some of the rules comprising masked bits in addition to the unmasked bits;
   extracting rule patterns from the corpus, each rule pattern defining a different, respective sequence of masked and unmasked bits to which one or more of the rules conforms;
   defining in a random access memory (RAM) multiple hash tables, wherein each hash table corresponds to a respective rule pattern and used for searching among the rules conforming to that rule pattern for a rule that matches a given classification key, and wherein a match result of a given rule in a given hash table is also indicative of which of the other hash tables are to be used for subsequent searching of rules that match the given classification key; and
   classifying the data items by matching the respective classification keys to the rules using one or more of the hash tables.

2. The method according to claim 1, wherein matching the classification keys comprises extracting from the classification keys bit strings of unmasked bits in accordance with the respective rule patterns, and searching for matching rules in the hash tables using the extracted bit strings of the unmasked bits.

3. The method according to claim 1, wherein the rules are assigned respective rule priorities, and wherein matching the classification keys comprises selecting an outcome rule from among multiple matching rules that match a given classification key and conform to different respective rule patterns, based on the rule priorities of the matching rules.

4. The method according to claim 1, wherein defining the hash tables comprises excluding from the other hash tables, which are to be subsequently searched according to a given rule, a hash table whose entire rules do not match any classification key that matches the given rule.

5. The method according to claim 1, wherein defining the hash tables comprises excluding from the other hash tables, which are to be subsequently searched according to a given rule, a hash table whose rules are all assigned respective rule priorities lower than a rule priority assigned to the given rule.

6. The method according to claim 1, wherein defining the hash tables comprises determining a scanning order of the other hash tables based on rule priorities assigned to the rules of the other hash tables.

7. The method according to claim 1, wherein defining the hash tables comprises determining a scanning order of the other hash tables, based on numbers of hash tables to be searched according to the rules in the other hash tables.

8. The method according to claim 1, wherein defining the hash tables comprises determining a scanning order of the other hash tables based on numbers of rules conforming to the respective rule patterns of the other hash tables.

9. The method according to claim 1, wherein defining the hash tables comprises assigning to the rules in each of the hash tables respective lists of one or more other hash tables to search when a matching rule is found, and in response to adding a rule to a respective given hash table, including the given hash table in lists assigned to rules in other hash tables based on the added rule.

10. The method according to claim 1, wherein matching the classification keys comprises scanning multiple hash tables sequentially, and adapting a scanning order of the hash tables based on rules that were previously found matching to the classification keys.

11. A classification apparatus, comprising:
a random access memory (RAM), which is configured to store hash tables corresponding to a corpus of rules, each rule comprising a respective set of unmasked bits having corresponding bit values, and at least some of the rules comprising masked bits in addition to the unmasked bits,
wherein the rules conform to respective rule patterns, each rule pattern defining a different, respective sequence of masked and unmasked bits to which one or more of the rules conform, and each of the hash tables corresponds to a respective rule pattern and used for searching among the rules conforming to that rule pattern for a rule that matches a given classification key, and wherein a match result of a given rule in a given hash table is also indicative of which of the other hash tables are to be used for subsequent searching of rules that match the given classification key; and
a decision logic pipeline, which is configured to:
define the hash tables stored in the RAM;
extract respective classification keys from a collection of data items, each classification key comprising a string of bits; and
classify the data items by matching the respective classification keys to the rules using one or more of the hash tables.

12. The classification apparatus according to claim 11, wherein the decision logic pipeline is configured to extract from the classification keys bit strings of unmasked bits in accordance with the respective rule patterns, and to search for matching rules in the hash tables using the extracted bit strings of the unmasked bits.

13. The classification apparatus according to claim 11, wherein the rules are assigned respective rule priorities, and wherein the decision logic pipeline is configured to match the classification keys by selecting an outcome rule from among multiple matching rules that match a given classification key and conform to different respective rule patterns, based on the rule priorities of the matching rules.

14. The classification apparatus according to claim 11, wherein the decision logic pipeline is configured to define the hash tables by excluding from the other hash tables, which are to be subsequently searched according to a given rule, a hash table whose entire rules do not match any classification key that matches the given rule.

15. The classification apparatus according to claim 11, wherein the decision logic pipeline is configured to define the hash tables by excluding from the other hash tables, which are to be subsequently searched according to a given rule, a hash table whose rules are all assigned respective rule priorities lower than a rule priority assigned to the given rule.

16. The classification apparatus according to claim 11, wherein the decision logic pipeline is configured to determine a scanning order of the other hash tables based on rule priorities assigned to the rules of the other hash tables.

17. The classification apparatus according to claim 11, wherein the decision logic pipeline is configured to determine a scanning order of the other hash tables, based on numbers of hash tables to be searched according to the rules in the other hash tables.

18. The classification apparatus according to claim 11, wherein the decision logic pipeline is configured to determine a scanning order of the other hash tables based on numbers of rules conforming to the respective rule patterns of the other hash tables.

19. The classification apparatus according to claim 11, wherein the decision logic pipeline is configured to define the hash tables by assigning to the rules in each of the hash tables respective lists of one or more other hash tables to search when a matching rule is found, and in response to adding a rule to a respective given hash table, including the given hash table in lists assigned to rules in other hash tables based on the added rule.

20. The classification apparatus according to claim 11, wherein the decision logic pipeline is configured to match the classification keys by scanning multiple hash tables sequentially, and adapting a scanning order of the hash tables based on rules that were previously found matching to the classification keys.

* * * * *